United States Patent
Black et al.

(10) Patent No.: US 8,205,010 B1
(45) Date of Patent: Jun. 19, 2012

(54) USER SYSTEM APPLICATON INTERACTION FOR A SYSTEM AS A SERVICE

(75) Inventors: David Black, Dublin (IE); Daniel Walter Beck, San Francisco, CA (US)

(73) Assignee: Workday, Inc., Pleasanton, CA (US)

( * ) Notice: Subject to any disclaimer, the term of this patent is extended or adjusted under 35 U.S.C. 154(b) by 86 days.

(21) Appl. No.: 12/653,732

(22) Filed: Dec. 16, 2009

(51) Int. Cl.
*G06F 15/16* (2006.01)
(52) U.S. Cl. .................. 709/246; 709/220; 709/223
(58) Field of Classification Search .............. 709/220, 709/223, 246
See application file for complete search history.

(56) References Cited

U.S. PATENT DOCUMENTS

| | | | |
|---|---|---|---|
| 7,168,035 B1 * | 1/2007 | Bell et al. | 715/234 |
| 7,293,031 B1 * | 11/2007 | Dusker et al. | 1/1 |
| 7,533,118 B2 * | 5/2009 | Chaudri | 1/1 |
| 7,698,639 B2 * | 4/2010 | Kamdar et al. | 715/235 |
| 7,818,662 B2 * | 10/2010 | Nene et al. | 715/224 |
| 7,865,544 B2 * | 1/2011 | Kordun et al. | 709/200 |
| 2009/0006409 A1 * | 1/2009 | Yang et al. | 707/9 |

* cited by examiner

*Primary Examiner* — Hussein A. Elchanti
(74) *Attorney, Agent, or Firm* — Van Pelt, Yi & James LLP

(57) ABSTRACT

A system for providing data for loading a user system application comprises a processor and a memory. The processor is configured to generate a data for loading a user system application using a template and provide the data for loading the user system application. The memory is coupled to the processor and is configured to provide the processor with instructions.

20 Claims, 10 Drawing Sheets

| Request Leave of Absence | | | | | |
|---|---|---|---|---|---|
| Area | | | Leave of Absence Details | | |
| Restrictions | Required | Information Only | Required | Required | |
| Format | Lookup | Text | Lookup | YYYY-MM-DD | |
| Fields | Employee ID | Employee Name | Leave Type | First Day of Leave | |
| | 21008 | Betty Liu | PERS <30 | 2009-05-01 | |
| | 21008 | Betty Liu | PERS >30 | 2009-05-01 | |
| | 21100 | Peter Neumann | PERS >30 | 2009-05-01 | |
| | 21200 | Rose Tyler | PERS >30 | 2009-05-01 | |
| | 21200 | John Smith | 602.12 | 2009-05-01 | |

Fig. 4

USER SYSTEM APPLICATON INTERACTION FOR A SYSTEM AS A SERVICE

BACKGROUND OF THE INVENTION

In a networked business software system, it can be desirable to enable a system user to download a portion of the information in the system in a standard format for a standard user system application (for instance, as a Microsoft Excel document, as a Microsoft Visio®document, etc.). The system user may then edit or manipulate the data in any way he/she pleases within the standard user system application, increasing the usability of the business software system. However, the portion of information downloaded for the standard user system application typically will not display or function in a manner similar to the internal business software system display or function. Also, the business software system needs to be able to understand any uploaded modified information from the user system application.

BRIEF DESCRIPTION OF THE DRAWINGS

Various embodiments of the invention are disclosed in the following detailed description and the accompanying drawings.

FIG. 4 is a diagram illustrating an embodiment of a spreadsheet.

DETAILED DESCRIPTION

Figure 1A:
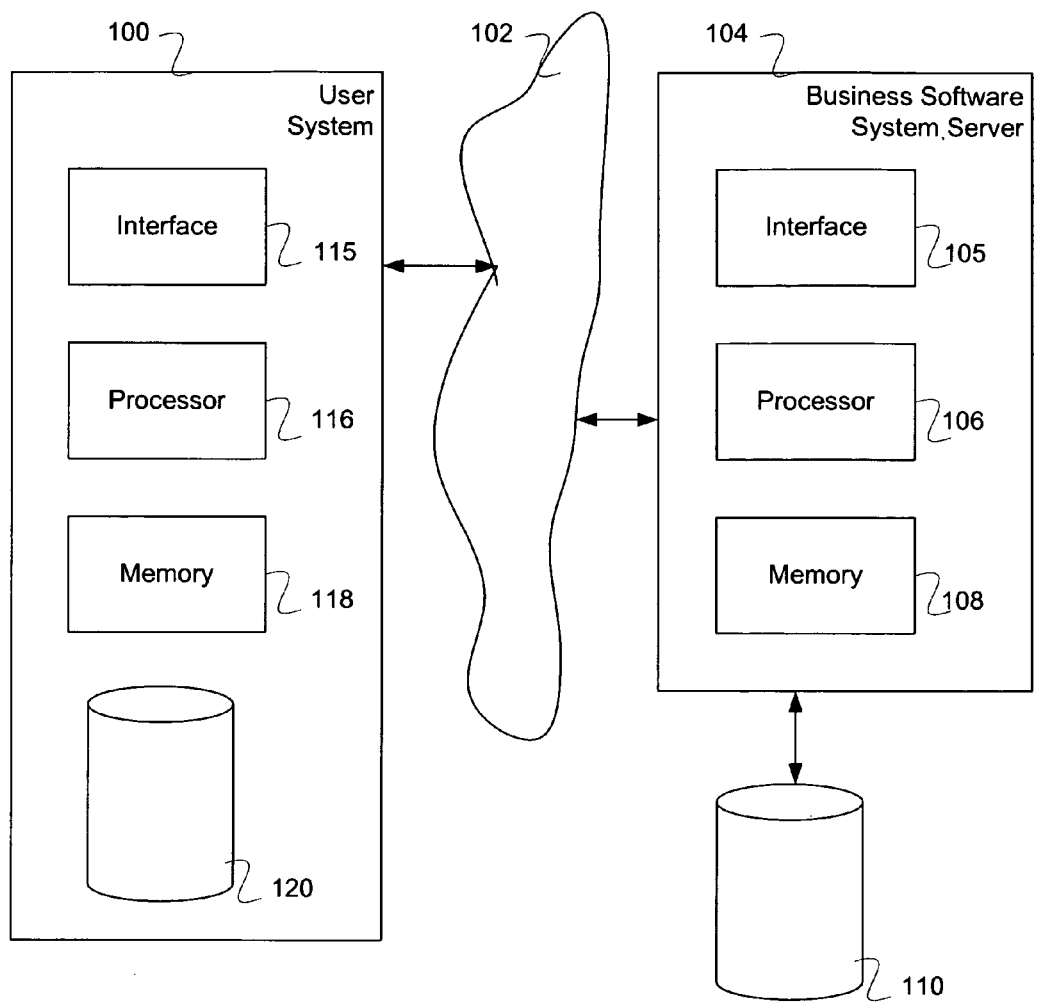
FIG. 1A is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

User system application interaction for a system as a service is disclosed. A business software system is accessed by a user over a network. The business software system allows a user to interact with business software system data using a user system application. For example, database information is viewed and manipulated by a user within a user system spreadsheet program by first downloading relevant information into the user system spreadsheet program and then after manipulation by the user is uploaded back into the business software system. A template based translation is used for providing the user system application with the relevant information so that the user system application can appropriately display and format the information. The template based translation uses directives that provide instructions related to the structure of the data (e.g., including filtering, changing cardinality, and primary and foreign key mapping), the formatting (e.g., including field typing, categorization, and information only designation), the data mapping, the data manipulation, the business process, and/or the business sub-process. The uploading of the manipulated information includes a validation of the information according to the directives. In some embodiments, the validation provides an error status related to the uploaded manipulated information to enable a user to repair any information that is not compatible with the business software system.

In some embodiments, the user system application comprises a spreadsheet application that is enabled for the user to manipulate the business software system's information. A set of rules, referred to as directives, is defined, each directive describing one aspect of one or both directions of a transformation between data stored in a business software system and data in a spreadsheet in a standard format. The directives are used by templates for the conversion of business system software information to and from user system application information, where each directive acts according to a default behavior unless commanded to do otherwise, allowing a user to select and use a template with a minimum of effort. A system user is able to use a template to download a spreadsheet containing business software system data, then modify that data and upload the modified spreadsheet back into the business software system data. The system recognizes the template the spreadsheet the user downloaded and uses the template to verify the modified spreadsheet when converting the modified spreadsheet back to data in the business software system. Since the system enters data from the user-modified spreadsheet into the business software system, data is able to pass from the spreadsheet into a business process being executed by the business software system when the spreadsheet is uploaded.

FIG. 1A is a block diagram illustrating an embodiment of a network system. In the example shown, business software system server 104 includes interface 105, processor 106 and memory 108. Business software system server 104 is coupled to external storage 110 so that business software system server 104 is able to store information to and access information from external storage 110. Business software system server 104 is also coupled to network 102 using interface 105. In various embodiments, network 102 comprises one or more of the following: a local area network, a wide area network, a wired network, a wireless network, the Internet, or any other appropriate network. User system 100 comprising a business software system client accesses business software system server 104 via network 102. User system 100 includes interface 115, processor 116 and memory 118. User system 100 is coupled to internal storage 120 so that user system 100 is able to store information to and access information from internal storage 120. In some embodiments, business software system client of user system 100 accesses an application running on business software system server 104. The application executes business processes based on stored data. In various embodiments, stored data is related to a business requirement such as an expense report, a personnel file, data related to an employee, or any other relevant data. In various embodiments, the application comprises an enterprise application, a human resources application, a business process application, a finance application, a content management application, or any other appropriate application.

In various embodiments, business software system server 104 comprises one or more physical servers with one or more processors, one or more memories, and one or more other storage devices (e.g., internal/external hard drives, array of drives, etc.) and/or one or more virtual environments (e.g., virtualization of operating system or application processes) in which an application is executed. In various embodiments, business software system server 104 comprises a virtual system or virtual systems executing on one or more hardware platforms. In various embodiments, user system 100 comprises one or more physical systems with one or more processors, one or more memories, and one or more other storage devices (e.g., internal/external hard drives, array of drives, etc.) and/or one or more virtual environments (e.g., virtualization of operating system or application processes) in which a user application is executed. In various embodiments, user system 100 comprises a virtual system or virtual systems executing on one or more hardware platforms.

Figure 1B:
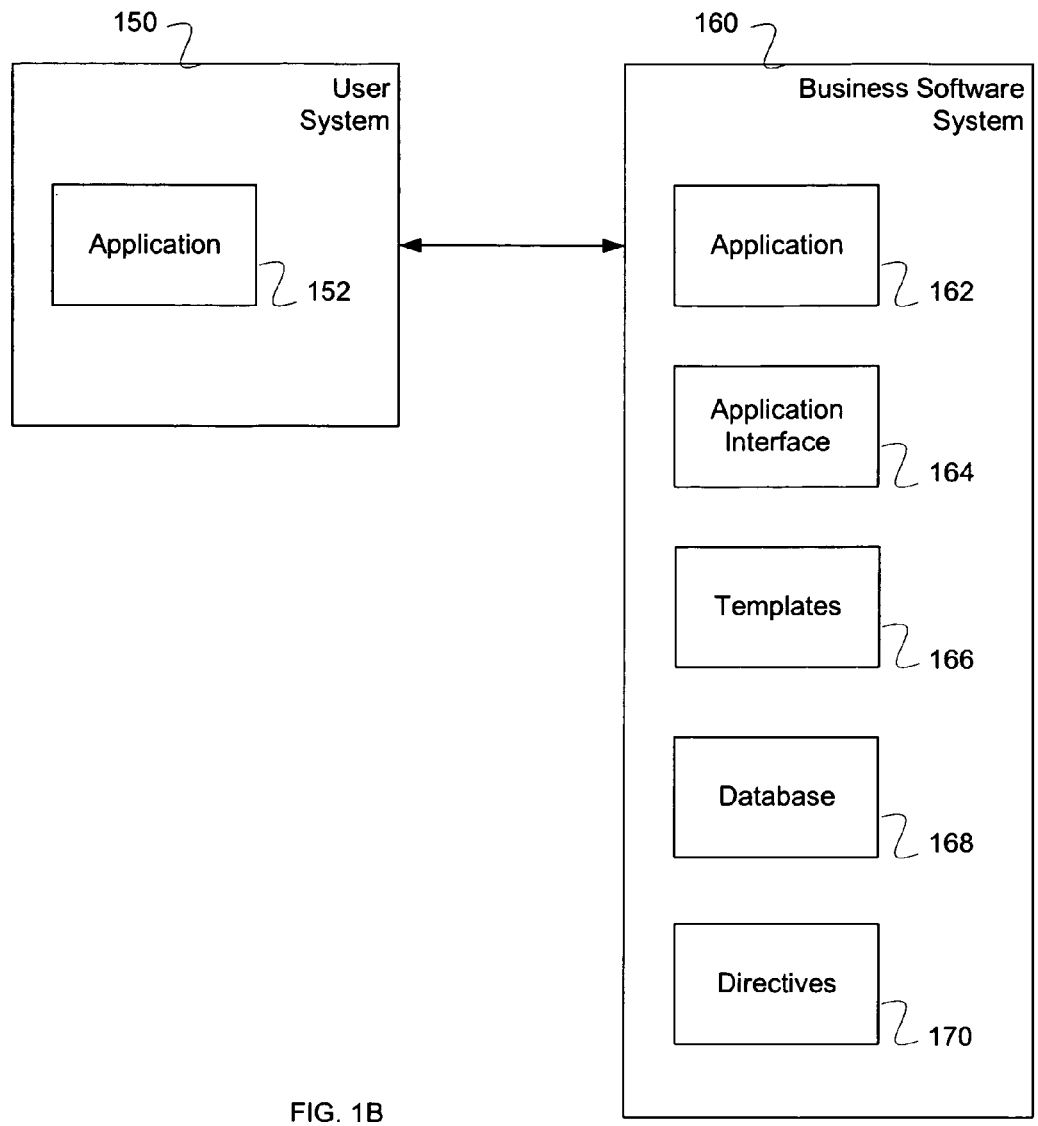
FIG. 1B is a block diagram illustrating an embodiment of a network system.

FIG. 1B is a block diagram illustrating an embodiment of a network system. In the example shown, user system 150 includes application 152. For example, a personal computer with a spreadsheet program, a drawing program, or a database program. User system 150 interacts with business software system 160. Business software system 160 includes application 162, application interface 164, templates 166, database 168, and directives 170. User system 150 uses application 152 to modify information from business software system 160 that has been converted using application interface 164 and using templates 166. In some embodiments, data from database 168 is transferred from application 162 according to templates 166 indications and directives 170, which is then able to be augmented or modified by user using application 152. Modified data is then transferred back and entered into business software system 160 using application interface 164 and stored in database 168.

In some embodiments, templates 166 comprise a set of instructions for accessing data (e.g., data stored in database 168) and translating to and from a standard format (e.g., as a spreadsheet). In various embodiments, templates 166 are designed by the business software system developer, are designed by a business software system user, are designed by a business software system administrator, or are designed by any other appropriate template creator. In some embodiments, a template is customized by starting with a pre-stored template and allowing a user to modify the template before the template is stored again in a template storage area. In various embodiments, templates 166 include instructions for including or not including data from database 168. Instructions contained within a template describing translation to and from a standard format are referred to as directives. In various embodiments, a template is stored in templates 166 and a directive is stored in directives 170, a directive is stored directly in templates 166, a directive is stored in directives 170, or any other appropriate manner of storing. In various embodiments, directives 170 describe data categorization, data fields, arrangement of data in the standard format, data hiding, data transformations, or any other appropriate data processing or formatting instructions. In some embodiments, directives describe business processes to be executed (e.g., by a business software system server) when the standard format document is converted back to the data storage format of business software system 160. Application interface 164 additionally comprises software for converting user system application information to business software system information. For example, for converting a document in a standard format (e.g., the standard format of a user system application—Excel®, Visio®, etc.) into data in the data storage format of business software system 160.

In some embodiments of business software system 160, directives 170 can be migrated across versions of application interface 164. For example if directives were applied to a data element of mailing address in v1 (e.g., version one) of business software system 160 application interface 164, the same directives can be used without making changes to in v2 (e.g., version 2) of the business software system 160.

In some embodiments of business software system 160, directives 170 can be inherited based on additions to the application interface 164. If directives are applied to a section of the data model and new child elements are added within that section then directives are applied automatically to the new child elements using inheritance. For example if a new field is added to a mailing address that field will inherit the directive data categorization reference for the mailing address.

Figure 2:
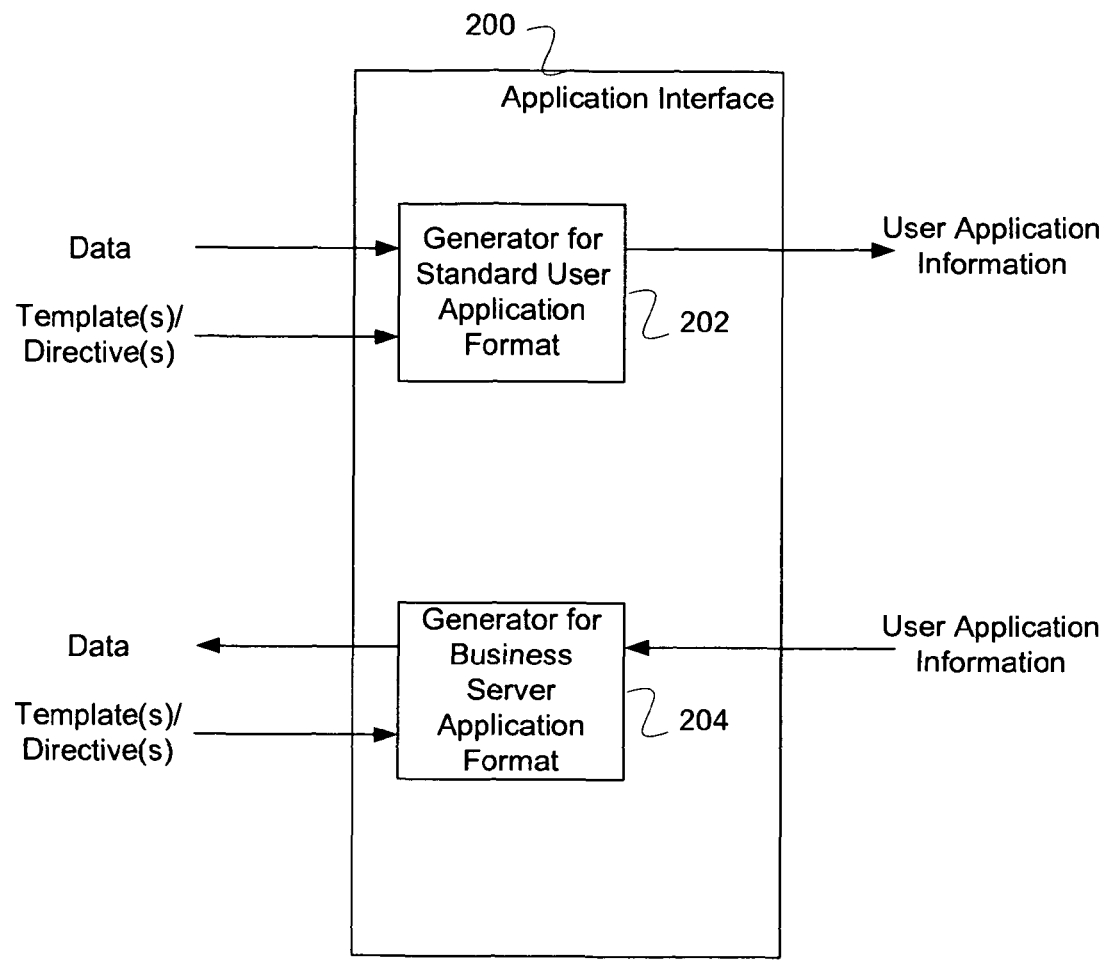
FIG. 2 is a block diagram illustrating an embodiment of an application interface.

FIG. 2 is a block diagram illustrating an embodiment of an application interface. In some embodiments, application interface 200 of FIG. 2 is used to implement application interface 164 of FIG. 1B. In the example shown, application interface 200 comprises generator for standard user application format 202 which takes as input data (e.g., data from a business software system database) and template(s)/directive(s) (e.g., directives which help to generate a template). Generator for standard user application format 202 generates standard user application format and provides standard user application format to a user system. Application interface 200 comprises generator for business server application format 204, which takes as input user application information. Generator for business server application format 204 also takes as input template(s)/directive(s) which are used for translation of the format and/or validation of the input data to the business software system.

Figure 3:
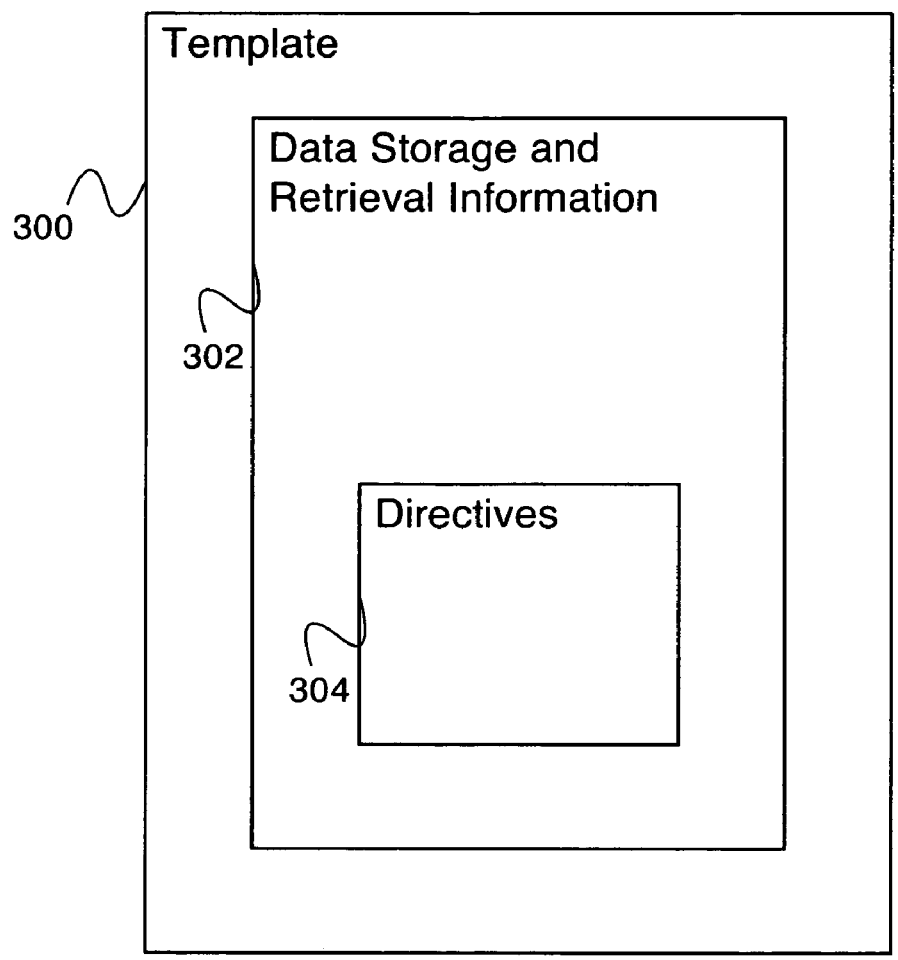
FIG. 3 is a block diagram illustrating an embodiment of a template.

FIG. 3 is a block diagram illustrating an embodiment of a template. In some embodiments, template information, database information, and directive information are stored in separate modules as shown in FIG. 1B. In the example shown, template 300 comprises data storage and retrieval information 302. Data storage and retrieval information 302 comprises information for retrieving and storing data from a database. In various embodiments, data storage and retrieval information 302 comprises compiled software instructions, interpreted software instructions, markup language instructions, or any other appropriate kind of data storage and retrieval information. In some embodiments, data storage and retrieval information 302 comprises a set of XML instructions.

Data storage and retrieval information 302 additionally comprises directives 304. Directives 304 are embedded in data storage and retrieval information 302, describing translation information for the data retrieved and stored using the information in data storage and retrieval information 302. In some embodiments, directives 304 are stored in a single block within data storage and retrieval information 302. In some embodiments, directives 304 are stored distributed throughout data storage and retrieval information 302, describing data translation information alongside the storage and retrieval information for the related data. In some embodiments, directives comprise XML commands that are inserted into the XML instructions comprising data storage and retrieval information 302.

FIG. 4 is a diagram illustrating an embodiment of a spreadsheet. In some embodiments, spreadsheet 400 of FIG. 4 has been created from a template (e.g., template 300 of FIG. 3 or template 166 of FIG. 1B) using a set of directives (e.g., directives 304 of FIG. 3 or directives 170 of FIG. 1B) to describe the data formatting. In the example shown, spreadsheet 400 comprises a list of leave of absence requests and details regarding the leave of absence requests. Spreadsheet formatting information including spreadsheet title (e.g., 'Request Leave of Absence'), column headings (e.g., 'Employee ID', 'Employee Name', 'Leave Type', 'First Day of Leave'), entry format, and column entry restrictions (e.g., column required, column for information only) are specified by the directives embedded in the template used to create the spreadsheet. In some embodiments, the template used to create the spreadsheet additionally comprises a directive describing a business process to be executed upon the uploading of the spreadsheet. In the example shown, the information in spreadsheet 400 are divided into two parts, headings 402, which are created from directives stored in the generating template; and data 404, which is retrieved based on the data storage and retrieval information (e.g., data storage and retrieval information 302 of FIG. 3) stored in the generating template.

In some embodiments of typical system usage, a system user (e.g., user system 100 of FIG. 1A) makes a request to the business software system server (e.g., business software system server 104 of FIG. 1A) via the World Wide Web (e.g., provided by network 102 of FIG. 1A). The user desires to modify the current list of leave of absence requests, and thus selects the 'Request Leave of Absence' template. Data relevant to the current leave of absence template is downloaded (e.g., according to instructions in data storage and retrieval information 302 of FIG. 3) and translated into spreadsheet format using directives (e.g., directives 304 of FIG. 3). Once the spreadsheet has been created, it is downloaded to the user's computer and can be displayed as in FIG. 4. The user then modifies the data in the spreadsheet as desired and, when complete, makes an indication via the World Wide Web interface. The spreadsheet is uploaded and the modified information is stored and processed as described by the directives stored in the template originally used to create the spreadsheet.

Figure 5A:
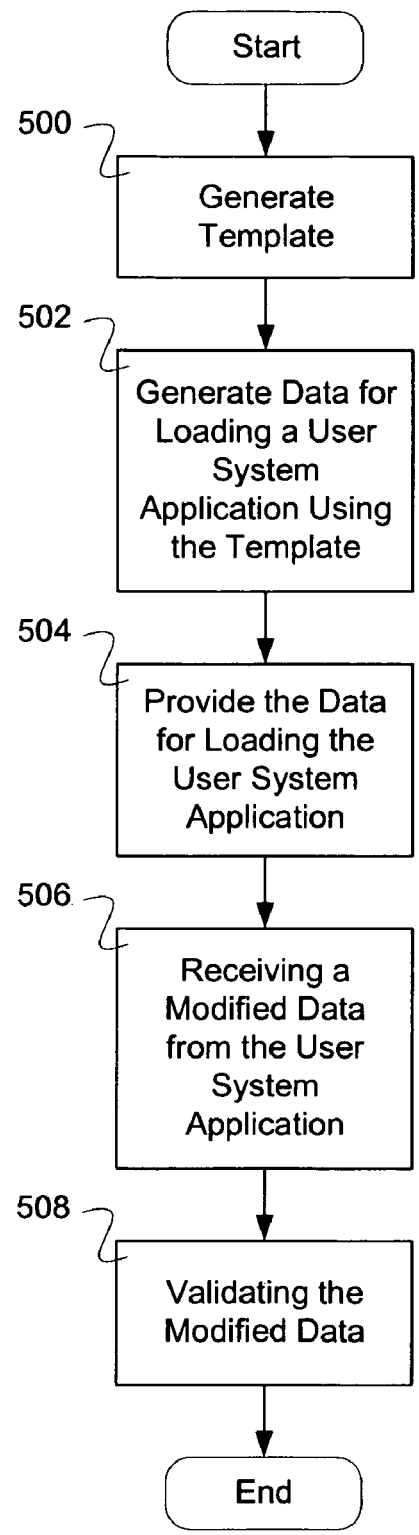
FIG. 5A is a flow diagram illustrating an embodiment of a process for providing data for loading a user system application.

FIG. 5A is a flow diagram illustrating an embodiment of a process for providing data for loading a user system application. In the example shown, in 500 a template is generated. In 502, data for loading a user system application is generated using the template. In 504, the data is provided for loading the user system application. In 506, a modified data is received from the user system application. In 508, the modified data is validated.

In the following examples, a spreadsheet application is used to illustrate the embodiments and should not be taken to be restrictive of the types of applications with which directives/templates can be used. It should be understood by a person practiced in the art that any other application—for example, a database, a word processor, a drawing application, or any other application—could be used for the example embodiments below. In the example embodiments below, directives comprise metadata that directs the generation of spreadsheet application format data from business application server format data. In some embodiments, the generation of spreadsheet format data includes extraction of data from the business application server format data. In various embodiments, directives comprise presentation directives, structure directives, and transformation directives, or any other appropriate directives. In various embodiments, directives comprise exclude (e.g., from being viewed), category (e.g., setting a category), reference-id (e.g., cross-referencing), multiple-occurs (e.g., showing a multiple representative child on the same sheet), override-max-occurs (e.g., limiting the occurrence in a sheet), section (e.g., separating data out to a different sheet), key (e.g., associates child elements with parent elements on related sections or sheets), header, restriction (e.g., describing restrictions for a field), format (e.g., describing formatting or data type for a field), field (e.g., describing a field), info-field (e.g., additional field not from data model), always-include, hidden, transform, business-process, business-sub-process, column, configuration, and any other appropriate.

Figure 5B:
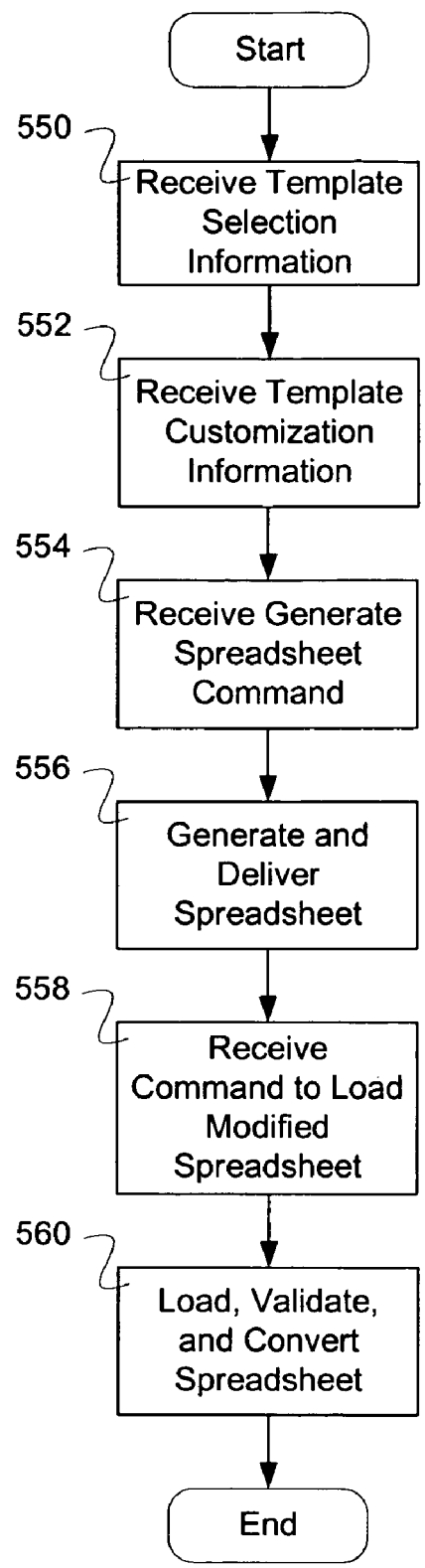
FIG. 5B is a flow diagram illustrating an embodiment of a process for delivering and processing a spreadsheet without data.

FIG. 5B is a flow diagram illustrating an embodiment of a process for delivering and processing a spreadsheet without data. In some embodiments, the process of FIG. 5B is executed by a business software system server (e.g., business software system server 104 of FIG. 1A). In 550, the system receives template selection information. In some embodiments, template selection information indicates which one of many stored templates (e.g., templates 166 of FIG. 1B) is to be used in the process of delivering and processing a spreadsheet. In 552, the system receives template customization information. In some embodiments, the user chooses to customize the template used. In some embodiments, template customization information includes whether or not the user desires the spreadsheet that is to be generated includes data. In some embodiments, the user desires that a generated spreadsheet contains data retrieved from the database (e.g., a spreadsheet as in spreadsheet 400 of FIG. 4 containing data as in data 404 of FIG. 4). In some embodiments, the user desires a generated spreadsheet with no data (e.g., a spreadsheet as in spreadsheet 400 of FIG. 4 containing headers as in headers 402 of FIG. 4 but with data as in data 404 of FIG. 4 left blank). In 554, the system receives the generate template command, and the process proceeds to 556. In 556, the system generates and delivers a spreadsheet to the system user. In some embodiments, the spreadsheet generation is performed by an appropriate template converter (e.g., generator for standard user application format 202 of FIG. 2). In 558, the system receives the command to load the modified spreadsheet, indicating the user has performed all desired modifications to the spreadsheet. In various embodiments, modifications to the spreadsheet include adding new rows of data to the spreadsheet, modifying data delivered with the spreadsheet, or any other appropriate spreadsheet modifications. In 560, the system loads, validates, and converts the spreadsheet in order to enter data from the spreadsheet into the system data storage. Additionally, in 560, the system executes business processes as indicated in any business process directives stored in the template selected in 550. The process then ends.

Figure 6:
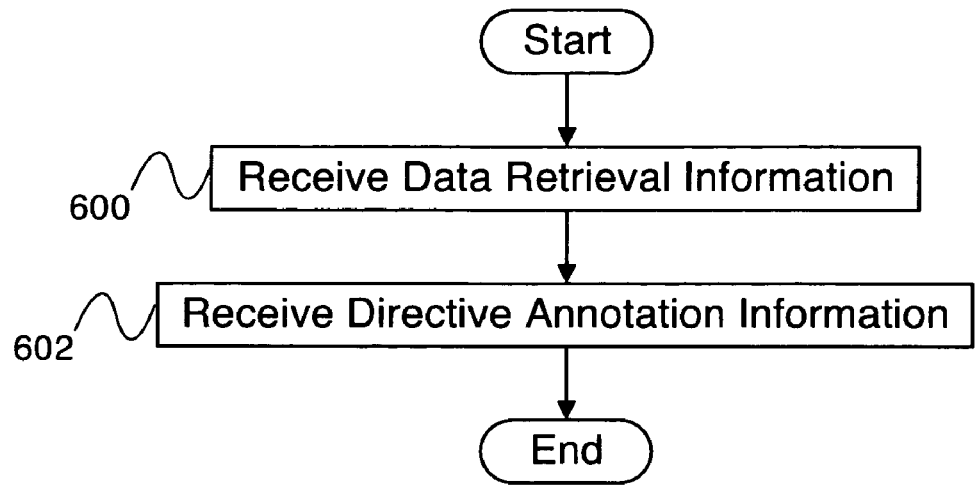
FIG. 6 is a flow diagram illustrating an embodiment of a process for creating a template.

FIG. 6 is a flow diagram illustrating an embodiment of a process for creating a template. In various embodiments, templates are designed by the business software system developer, are designed by a business software system user, are designed by a business software system administrator, or are designed by any other appropriate party or parties. In the example shown, in 600 data retrieval information is received by the business software system (e.g., business software system server 104 of FIG. 1A). In some embodiments, data retrieval information comprises information regarding what data stored in the business software system (e.g., database 168 of FIG. 1B) should be included in the generated spreadsheet. In 602, directive annotation information is received. In some embodiments, directive annotation information comprises directives (e.g., directives 170 of FIG. 1B, directives 304 of FIG. 3) annotating the data retrieval information (e.g., data retrieval information received in 600) to specify how the data retrieved should be formatted in the eventually generated spreadsheet. In some embodiments, directive annotation information additionally comprises directives to specify a business process to be executed by the business software system after the modified spreadsheet has been loaded. The process then ends.

Figure 7:
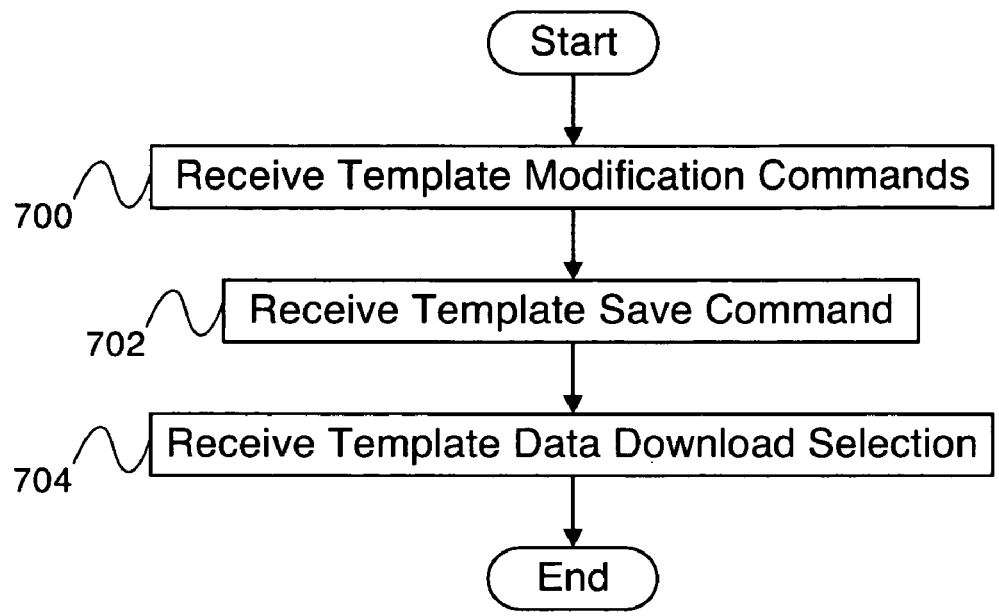
FIG. 7 is a flow diagram illustrating an embodiment of a process for receiving template customization information.

FIG. 7 is a flow diagram illustrating an embodiment of a process for receiving template customization information. In some embodiments, the process of FIG. 7 is executed by a business software system (e.g., business software system server 104 of FIG. 1A). In some embodiments, the process of FIG. 7 implements 552 of FIG. 5B. In the example shown, in 700, template modification commands are received. In some embodiments, template modification commands comprise modifications to the directives (e.g., directives 170 of FIG. 1B, directives 304 of FIG. 3) specified for the template. In 702, the template save command is received. In some embodiments, the modified template is saved by the business software system such that it can be used again without repeating the modifications. In various embodiments, the modified template is saved so that only the user who made the modifications can access it, so that any user belonging to the same organization as the user who made the modifications can access it, so that any user accessing the business software system can access it, or so that any other appropriate user or set of users can access it. In 704, the template data download selection is received. In some embodiments, the user is able to choose whether data specified in the template (e.g., data specified by data retrieval information retrieved in 600 of FIG. 6) is to be downloaded into the eventually generated spreadsheet. The process then ends.

Figure 8:
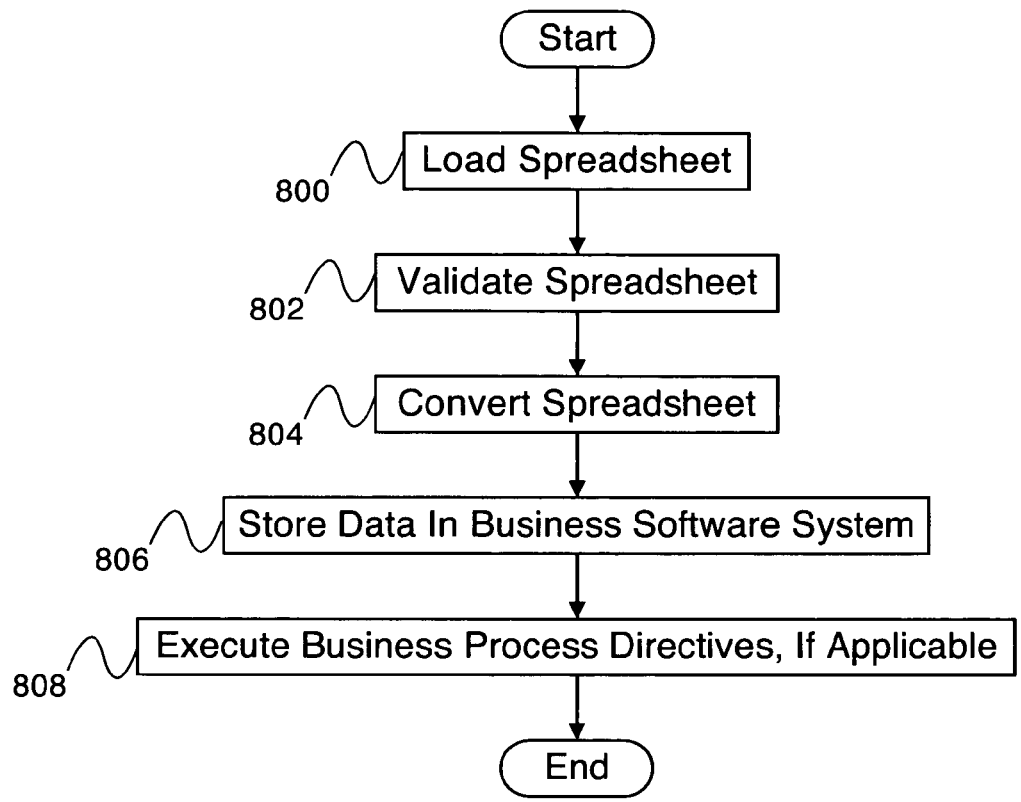
FIG. 8 is a flow diagram illustrating a process for loading, validating, and converting a spreadsheet.

FIG. 8 is a flow diagram illustrating a process for loading, validating, and converting a spreadsheet. In some embodiments, the process of FIG. 8 is executed by a business software system (e.g., business software system server 104 of FIG. 1A). In some embodiments, the process of FIG. 8 implements 560 of FIG. 5B. In the example shown, in 800, the spreadsheet is loaded. In some embodiments, loading the spreadsheet comprises uploading the spreadsheet from the computer of the business software system user to the business software system. In 802, the spreadsheet is validated. In some embodiments, validating the spreadsheet comprises comparing the spreadsheet with the template used to create it (e.g., the template selection received in 550 of FIG. 5B or the template with customization information received in 554 with customization information received in 552 of FIG. 5B) in order to validate that the data stored in it can be recognized correctly by the business software system. In 804, the spreadsheet is converted. In some embodiments, converting the spreadsheet comprises converting it from the standard spreadsheet format to the format used by the business software system to store data (e.g., in database 168 of FIG. 1B). In some embodiments, the spreadsheet conversion is performed by an appropriate format converter (e.g., generator for standard user application format 202 of FIG. 2). In 806, the data is stored in the business software system. In 808, the business software system executes business process directives, if applicable. In some embodiments, business process directives are stored in the template used to create the spreadsheet being loaded, validated, and converted. The business processes specified by these directives are executed. The process then ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for providing data from a business software system for loading a user system application, comprising:
    a business software system data stored on a storage device; and
    a processor configured to:
        generate the business software system data for loading into a user system application using a template, wherein the template generates the business software system data into a spreadsheet application format;
        send the business software system data in the spreadsheet application format for loading into the user system application;
        receive a modified business software system data in the spreadsheet application format;
        validate the modified business software system data in the spreadsheet application format, wherein validating comprises transforming the modified business software data from the spreadsheet application format back into data that is storable in the business software system; and
        enter the modified business software system data into the business software system; and
    a memory coupled to the processor and configured to provide the processor with instructions.

2. A system as in claim 1, wherein generating the business software system data for loading into the user system application using the template includes one or more directives.

3. A system as in claim 2, wherein the one or more directives comprise metadata embedded in an XML schema.

4. A system as in claim 2, wherein the one or more directives comprise one or more default directives.

5. A system as in claim 2, wherein the one or more directives comprise an inbound and an outbound directive.

6. A system as in claim 2, wherein the one or more directives comprise a directive associated with one or more of the following: structure of the data, formatting, data mapping, data manipulation, business process, and business subprocess.

7. A system as in claim 1, wherein the processor is further configured to generate the template.

8. A system as in claim 7, wherein the template comprises a customized template that is saved after customization.

9. A system as in claim 7, wherein the customized template comprises a tenant specific template.

10. A system as in claim 7, wherein the template includes instructions for appending data from the server system.

11. A system as in claim 7, wherein the template does not include instructions for appending data from the server system.

12. A system as in claim 1, wherein the user system application comprises an application that can read the spreadsheet application format.

13. A system as in claim 1, wherein receiving the modified business software system data comprises receiving a modified spreadsheet file from the user system application.

14. A system as in claim 13, wherein the modified business software system data received from the user system application is validated using the template that was used to generate the data for loading into the user system application.

15. A system as in claim 14, wherein validation includes providing status including one or more errors.

16. A system as in claim 14, wherein validation uses one or more directives.

17. A system as in claim 1, wherein the modified business software system data is converted for a business software system server.

18. A system as in claim 17, wherein the business software system server executes a business process using a data associated with the modified spreadsheet.

19. A method for providing data from a business software system for loading a user system application, comprising:
- generating a business software system data, using a processor, for loading into a user system application using a template, wherein the template generates the business software system data into a spreadsheet application format;
- sending the business software system data in the spreadsheet application format for loading into the user system application;
- receiving a modified business software system data in the spreadsheet application format;
- validating the modified business software system data in the spreadsheet application format, wherein validating comprises transforming the modified business software data from the spreadsheet application format back into data storable in the business software system; and
- entering the modified business software system data into the business software system.

20. A computer program product for providing data from a business software system for loading a user system application, the computer program product being embodied in a non-transitory computer readable storage medium and comprising computer instructions for:
- generating a business software system data for loading into a user system application using a template, wherein the template generates the business software system data into a spreadsheet application format;
- sending the business software system data in the spreadsheet application format for loading into the user system application;
- receiving a modified business software system data in the spreadsheet application format;
- validating the modified business software system data in the spreadsheet application format, wherein validating comprises transforming the modified business software data from the spreadsheet application format back into data that is storable in the business software system; and
- entering the modified business software system data into the business software system.

\* \* \* \* \*